United States Patent [19]

Leibowitz et al.

[11] 3,824,562

[45] July 16, 1974

[54] HIGH SPEED RANDOM ACCESS MEMORY SHIFT REGISTER

[75] Inventors: Lawrence M. Leibowitz, Fairfax, Va.; Charles F. Bates, Seat Pleasant, Md.

[73] Assignee: The United States of America as represented by the Secretary of the Navy, Washington, D.C.

[22] Filed: Mar. 30, 1973

[21] Appl. No.: 346,539

[52] U.S. Cl...... 340/172.5, 307/221 R, 340/174 SR

[51] Int. Cl........... G11c 19/00

[58] Field of Search.......... 340/172.5, 174 SR; 307/221 R; 328/37

[56] References Cited

UNITED STATES PATENTS

| | | | |
|---|---|---|---|
| 3,585,604 | 6/1971 | Lloyd | 340/172.5 |
| 3,636,519 | 1/1972 | Heath | 340/172.5 |
| 3,704,452 | 11/1972 | Beausoleil et al. | 340/172.5 |
| 3,735,361 | 5/1973 | Tasso | 340/172.5 |
| 3,742,466 | 6/1973 | Hamm et al. | 340/172.5 X |
| 3,760,367 | 9/1973 | Kortenhaus | 340/172.5 |

*Primary Examiner*—Paul J. Henon
*Assistant Examiner*—Melvin B. Chapnick
*Attorney, Agent, or Firm*—R. S. Sciascia; Arthur L. Branning; Robert E. O'Neill

[57] ABSTRACT

A number of Random Access Memory (RAM) units are controlled by read-write logic, memory address counters, and a clock distribution function to provide a high speed shift register. The high speed capability is obtained through the use of a plurality of lower speed RAMs by sequentially processing input data from the first RAM to the second, then the third, etc. The output is taken from each RAM and fed to a latch so that while one RAM is providing data as an output, a subsequent RAM is able to manipulate and operate on subsequent data. Extremely long, high speed shift registers may be realized by this invention with particular interest in the area of signal processing of radar video returns.

4 Claims, 3 Drawing Figures

HIGH SPEED RANDOM ACCESS MEMORY SHIFT REGISTER

BACKGROUND OF THE INVENTION

Electronic shift registers are of universal application in a multitude of devices, including computers, code generators, decoders, and radar signal processors. Considering the radar signal processor, for example, it is well known that the desired range and resolution of the processed data directly determines the requirement of the shift register speed and its length. Furthermore with the current improvements in the accuracy, resolution, and range of modern radar systems, extremely long, high speed shift registers become a prime requirement. Similarly with computers constantly improving and expanding in size, the length and speed requirements of the shift register have also become more stringent. Therefore in order to provide for these extraordinary shift register capabilities, we have developed a high speed shift register, the length of which may be easily increased to great size by employing a plurality of Random Access Memory (RAM) elements.

SUMMARY

A plurality of relative low speed RAM units are coupled to a clock distribution function such that the units are controlled in a sequentially operated and addressed read-write cycle. Data in the form of digital pulse trains on parallel lines, appearing at the input, is directed to a particular RAM as a function of the clock distribution. The data is read into the RAM, stored and subsequently clocked through an inverted NAND gate, and presented to a latch. The output of the latch provides the output of the shift register.

It is an object of this invention to provide a high speed, extremely long shift register.

Another object of this invention is to employ random access memory (RAM) elements in the shift register.

A further object of this invention is to provide system flexibility such that the length of the shift register may be increased by adding more RAM units or may be automatically programmed to be of variable length.

Also it is an object of this invention to construct the high-speed shift register from relatively low speed components.

Other objects, advantages and novel features of the invention will become apparent from the following detailed description of the invention when considered in conjunction with the accompanying drawings wherein:

THE DRAWINGS

DETAILED DESCRIPTION

Figure 1:
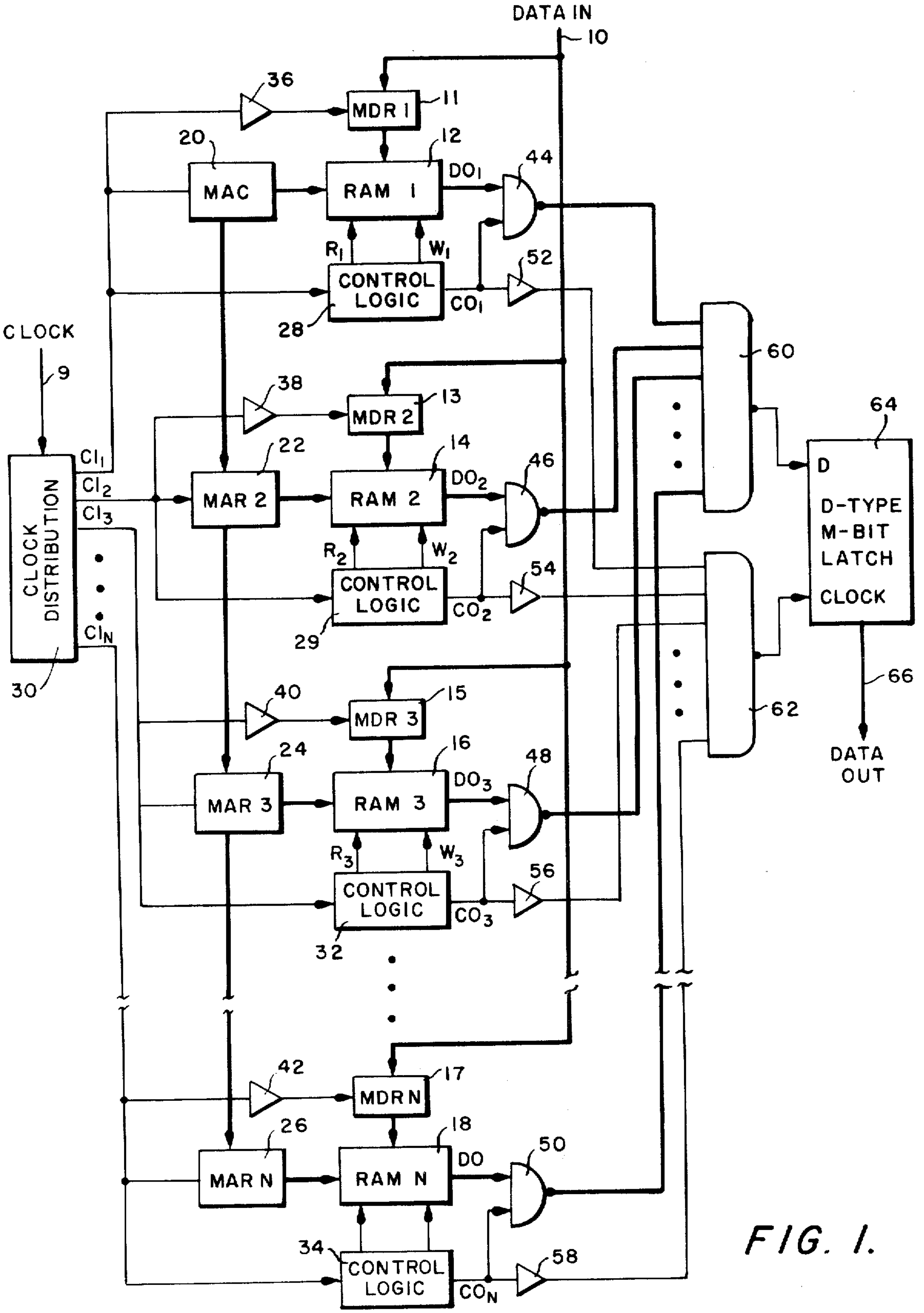
FIG. 1 is a block diagram of the high speed RAM shift register.

Referring to FIG. 1, a high speed shift register is shown for N stages. Each RAM block 12, 14, 16, and 18 represent a three-dimensional memory bank such as that which may be made up of 256 × 1 RAM integrated circuits for each L plane. Although the RAMs may be of various, different sizes, for purposes of explanation each RAM block 12, 14, 16 and 18 is considered to be of size of M × 1 × L. The RAM size of M × 1 × L simply means that there are L planes (where L = 1,2,...) each of M bits. Thus, it is possible to simultaneously process information from L parallel bit input lines. Therefore, the heavy flow lines of FIG. 1 depict the fact that the system as described herein is able to simultaneously process L parallel input bits. If there are N RAM circuits, as shown in FIG. 1, the overall shift register length is N × M for L bit words.

The clock input 9, which is synchronized with the L bit input data 10, is applied to the clock distribution network 30. This N output clock distributor 30 provides N succeeding clock pulses on N individual output lines $C1_1$, $C1_2$, $C1_3$. . . $C1_N$. Thus the first clock pulse received by distributor 30 appears on $C1_1$. The second pulse appears on $C1_2$. The Nth pulse appears on line N, and the N + 1 pulse appears on $C1_1$ again. Each of the clock distribution lines is connected in sequence to the addressing functions MAC (20), MAR 2 (22), MAR 3 (24), and MAR N (26). The first addressing circuit is controlled by clock pulse $C1_1$ and includes a memory address counter MAC 20. The MAC 20 may be any type of $\log_2 M$ bit binary counter. The size of the MAC 20 is $\log_2 M$ bits in order to properly control the ram. Upon the reception of the first clock pulse $C1_1$ the MAC addresses "address number 1" on each of the L levels, and at the second clock pulse $C1_{(N+1)}$ the MAC addresses "address number 2" on each of the L levels. This addressing function continues until M is reached and then the cycle is repeated. An ancillary output of the MAC 20 is applied to the addressing circuit for the RAM 2 (14). Since this output is able to provide the count, the addressing circuit for RAM 2 (22) need only be a memory address register (MAR) having $\log_2 M$ bit positions. Thus, when the pulse $C1_2$ appears the information from the MAC (20) provides the count to MAR 2 and the address from MAR 2(22) is applied to RAM 2 (14) accordingly. Subsequent MAR registers 24 and 26 operate in a similar manner.

Figure 2A:
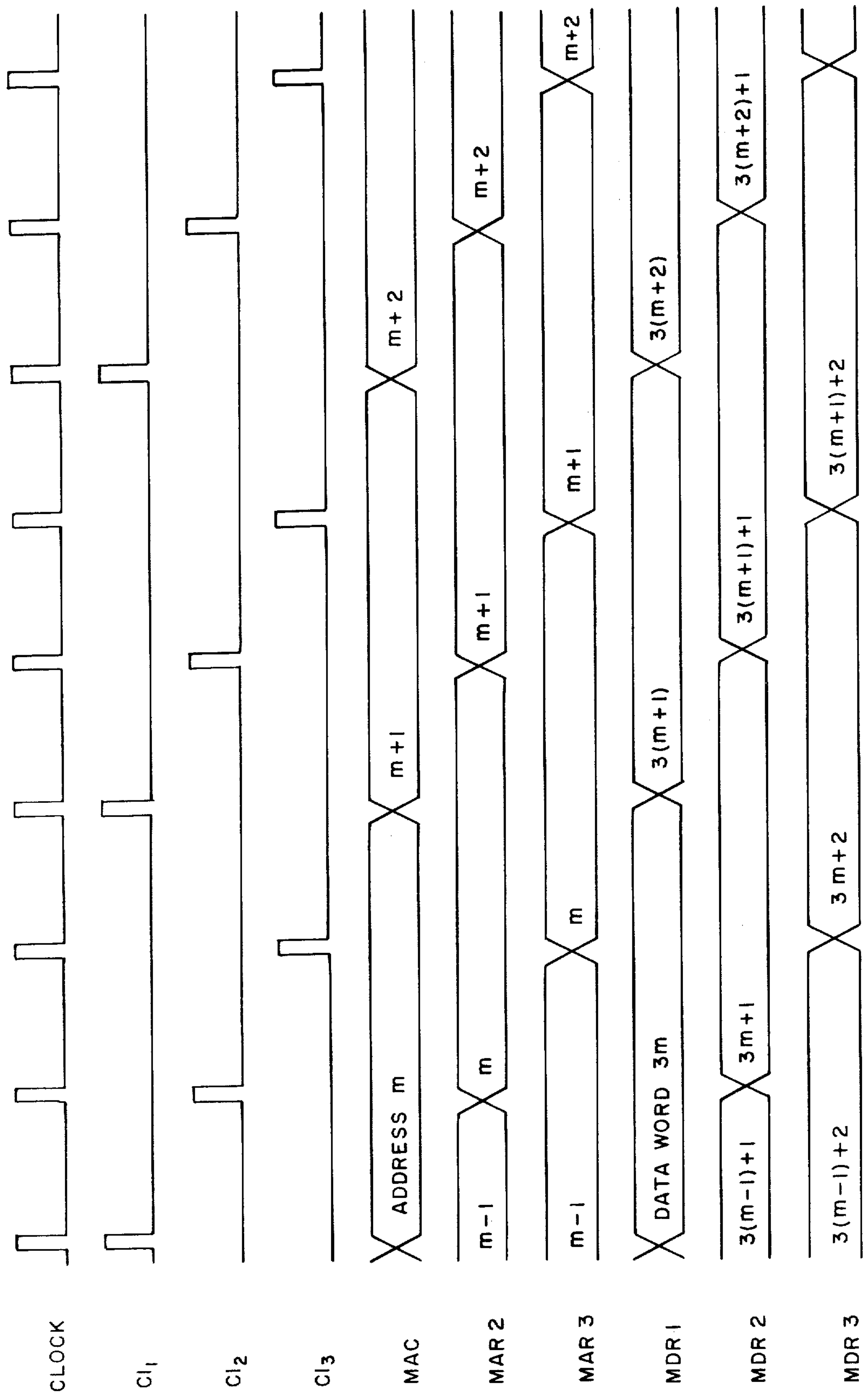
FIGS. 2A and 2B are timing diagrams corresponding to FIG. 1 for the special case of N = 3.
Figure 2B:
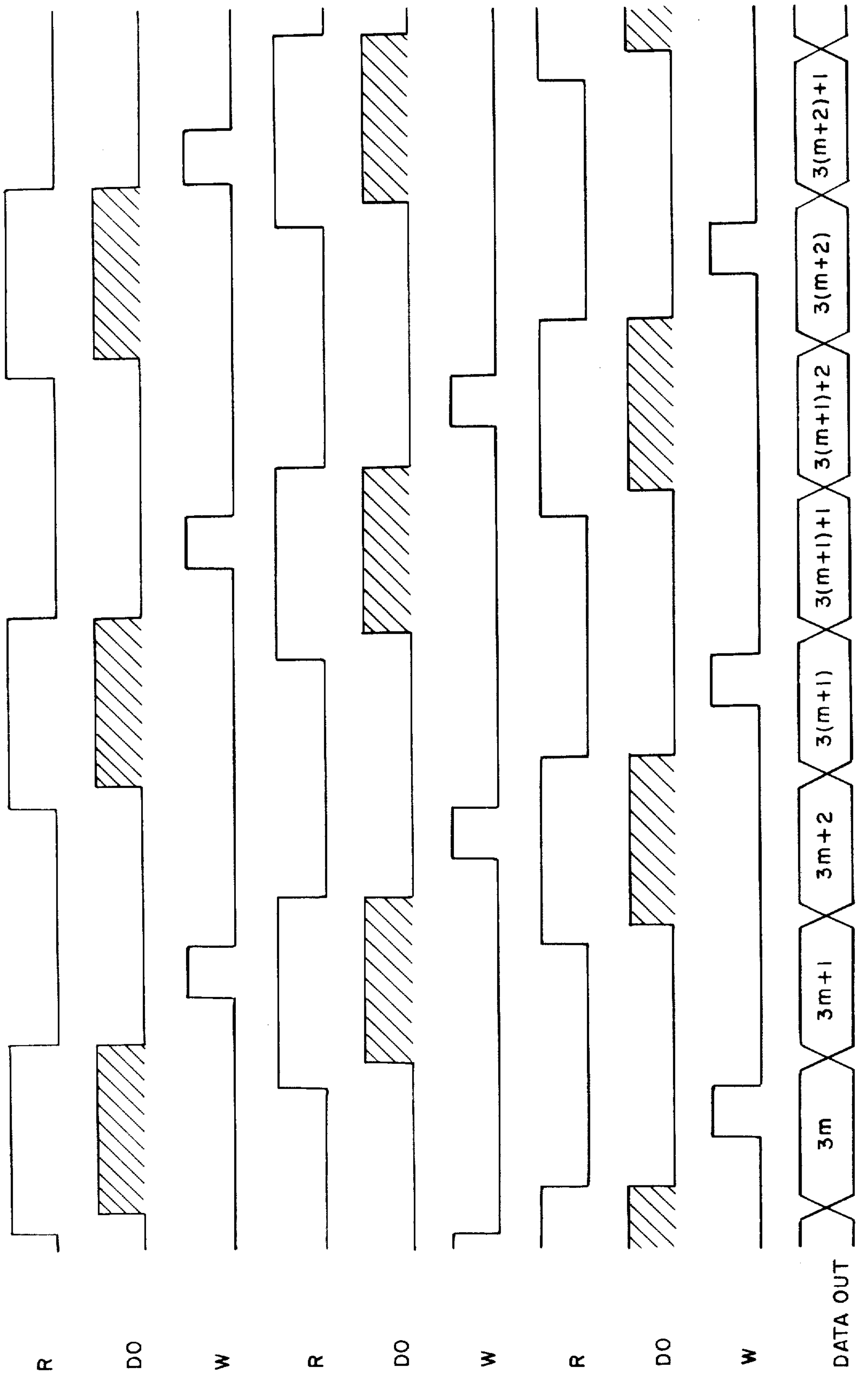

As can be most easily seen in FIGS. 2A and 2B for the special case of N = 3, the first and every third clock pulse thereafter appears on output $C1_1$, the second and every third pulse thereafter appears on $C1_2$ and so on. When $C1_1$ is applied to MAC (20), "address number 1" is provided to RAM 1 and RAM 1 may operate on that address. When $C1_1$ appears from clock distribution function 30 and is applied to MAR 2 the "address number 1" from the MAC (20) is provided to RAM 2. As succeeding clock distribution pulses $C1_2$, $C1_3$ . . . $C1_N$ occur the original memory address number from the MAC (20) appears at that respective MAR. However, when $C1_{(N+1)}$ occurs, which is the second $C1_1$ pulse, the MAC is increased to "address number 2."

Referring to FIG. 1 it can be seen that the clock distribution function is applied through an inverter to its respective memory data register (MDR). Since all data (10) appears at each of the MDR's, the clock distribution selectively and in succession gates data into the addressed RAM circuits 12, 14, 16 and 18.

The control logic 28, 29, 32 and 34 is also triggered by the clock distribution function and is responsible for controlling whether data from the MDR is read into the RAM or if the information in the RAM is read out on line D0. This read-modify-write cycle is controlled by a read and a write command pulse $R_n$, and $W_n$. Considering the read-modify-write cycle of the Nth RAM stage 18, it can be seen that following an update of the address input at MAR N (26), a read $R_N$ is generated by control logic 34 to start the read operation. Following the basic access time of the RAM, the accessed data already in the RAM from the previous read cycle is available at the data output D0, and $W_n$ is generated to write the new input data word into the same location in RAM N. In order that the data on the $D0_N$ output is synchronously passed through NAND gate 50, the control logic generates a delayed version of the clock distribution function $C1_n$. The delay is equal to the access time. Although the explanation above is directed to the RAM N (18) circuitry, the discussion also applies to the other RAM circuits 12, 14, and 16.

Data from the various RAM's are applied to NAND gate(s) 60 as a method of combining all signals to L level output lines. The data is then fed to a D type M bit latch 64 which is entered in response to the respective clock function which is gated from NAND gate 62 and is generated from the individual RAM control logic as derived from the logic clock.

Obviously many modifications and variations of the present invention are possible in light of the above teachings. For example, in selecting the clock frequency to perform a full read-modify-write cycle it should be apparent that if T sec. is the basic clock interval, each RAM has NxT sec. to perform. Therefore the overall high speed operation may be accomplished with relatively low speed RAM components. Also, by lowering the upper limit M of the MAC counter, the overall effective shift register length could be programmed to some length less than NxM. It is therefore to be understood that within the scope of the appended claims the invention may be practiced otherwise than as specifically described.

What is claimed and desired to be secured by letters patent of the United States is:

1. A shift register for shifting data which is coordinated by a common clocking function comprising:

input means for accepting data;

clock distribution means for providing a pulse distribution sequence on a plurality of output lines;

memory data register means coupled to said input means and to said plurality of output lines for gating the data in accordance with said pulse distribution sequence;

random access memory means coupled to said memory data register means for reading, storing, and writing the gated data into and out of a particular memory location;

memory control means coupled to said plurality of output lines and to said random access memory means for selecting said particular memory location;

a first combining means coupled to said memory control means for writing data into a latch means; and a second combining means coupled to said memory control means and to said latch means for serially shifting the data out of said latch means.

2. The shift register as claimed in claim 1 wherein said memory control means include addressing control circuit and read-write control logic.

3. The shift register as claimed in claim 1 wherein the clock distribution means has N output lines and a first pulse of said pulse distribution sequence is provided on a first output line, the second pulse is provided on the second output line and the Nth pulse is provided on output line N.

4. The shift register as claimed in claim 3 wherein said clock distribution means further includes means for cyclically repeating said pulse distribution sequence.

* * * * *